READOUT IMPLEMENTATION FOR MAGNETIC MEMORY
Filed Sept. 1, 1967 2 Sheets-Sheet 1
FIG. 1
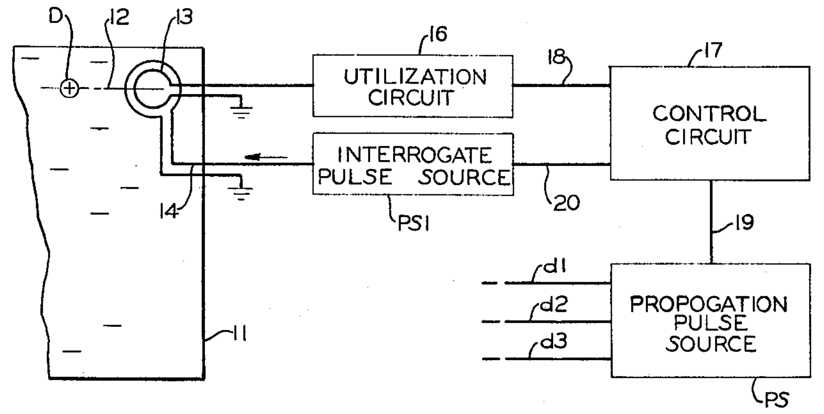
FIG. 2
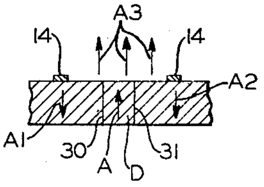
FIG. 3
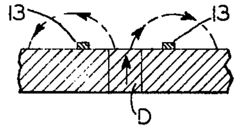
FIG. 5
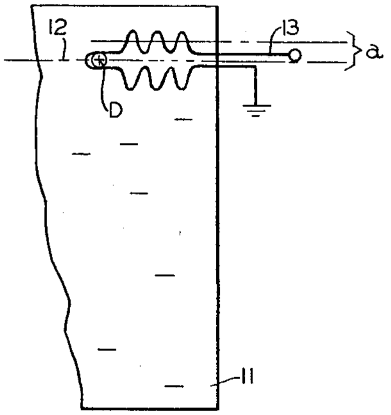
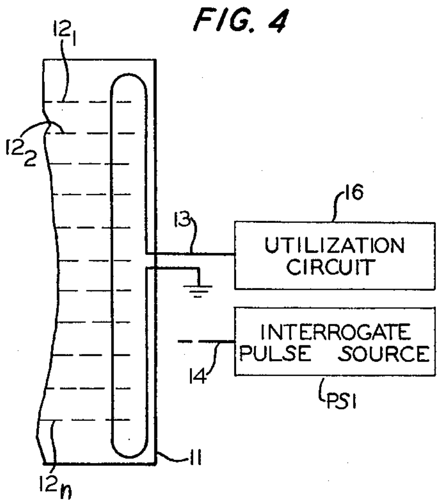
INVENTORS A. H. BOBECK
P. C. MICHAELIS
W. SHOCKLEY
BY Herbert M. Shapiro
ATTORNEY

READOUT IMPLEMENTATION FOR MAGNETIC MEMORY 3,508,222
READOUT IMPLEMENTATION FOR MAGNETIC MEMORY

Andrew H. Bobeck, Chatham, and Paul C. Michaelis, Watchung, N.J., and William Shockley, Stanford, Calif., assignors to Bell Telephone Laboratories, Incorporated, Murray Hill, N.J., a corporation of New York Filed Sept. 1, 1967, Ser. No. 665,086
Int. Cl. G11c *11/14, 19/00*
U.S. Cl. 340—174 9 Claims

ABSTRACT OF THE DISCLOSURE

Magnetic gain is realized by expanding a single wall domain into a relatively large area of magnetic material encompassed by an output conductor loop. A repetitive geometry for that loop not only enables modulated signals to be generated in the loop as domains are expanded there, but also permits significantly increased gain when a domain, once expanded, is later collapsed within the loops.

FIELD OF THE INVENTION

This invention relates to improvements in magnetic sheet arrangements where information is stored as single wall domains.

BACKGROUND OF THE INVENTION

The term "single wall domain" refers to a reverse magnetized domain in an otherwise magnetically saturated sheet where the domain wall bounding that domain is of a geometry independent of the boundary of the sheet.

Copending application Ser. No. 579,931, filed Sept. 16, 1966 for A. H. Bobeck, U. F. Gianola, R. C. Sherwood, and W. Shockley (now Patent 3,460,116) describes single wall domains in the context of a two-dimensional shift register. The magnetic sheet, illustratively, is a canted rare earth orthoferrite having a preferred direction of magnetization normal to the plane of the sheet. The sheet is saturated magnetically in a first direction normal to the plane of the sheet and a small illustratively circular portion of the sheet is reversed magnetically to a second direction normal to the plane of the sheet. The circular domain may be moved in any direction in the plane of the sheet by consecutively offset propagation fields in excess of a propagation threshold characteristic of the sheet in which it is so moved.

The operation and detection of single wall domains is described in the aforementioned copending application. Conveniently, a single wall domain is moved to an output position where an output coil typically of a geometry corresponding to that of the domain detects either the passage of the domain or, alternatively, the collapse of the domain in response to an interrogate field.

The outputs realized by means of the above implementations are relatively low. The reason for this is that the output voltage is a function of the rate of change in flux as the domain passes or collapses. As packing density increases, domain size decreases and, consequently, unless the flux is switched faster, the outputs are reduced.

An object of this invention is to provide an output implementation for single wall domain devices wherein relatively high outputs are achieved independent of the normal domain size.

SUMMARY OF THE INVENTION

The invention is based on the realization that an increase in the area of a domain provides magnetic gain by augmenting the amount of flux ultimately switched during the readout operation. The invention is further based on the realization that an output coil having a geometric pattern of variable magnetic coupling responds to an expanding or to a collapsing domain by providing an output signal which is a function of the geometric pattern, in the first instance, and by providing an output pulse amplified in proportion to an increased wall length in the second instance.

In one illustrative embodiment of this invention a single wall domain is moved into an output position coupled by a coil having a displaced sinusoidal geometry varying as $a+b \sin \theta$. The expansion of the domain at the output position couples the domain wall thereabout to the coil and generates therein a signal also varying approximately as $a+b \sin \theta$.

A feature of this invention then is an output implementation for a single wall domain arrangement comprising an output coupling having a repetitively varying geometry.

In another embodiment, a single output coil having a repetitively varying geometry couples the output position of several propagation channels in a multi-shift register organization. A domain in any channel is expanded at the output position when it arrives there.

Accordingly, another feature of this invention is an output implementation for a single wall domain arrangement comprising an output coil of repetitively varying geometry encompassing an area larger than the normal area of a domain and means expanding domains in the area encompassed.

BRIEF DESCRIPTION OF THE DRAWING

FIG. 1 is a schematic representation of an arrangement in accordance with this invention;

FIGS. 2 and 3 are schematic representations of portions of the arrangement of FIG. 1;

FIGS. 4, 5, and 14–16 are schematic representations of alternative arrangements in accordance with this invention;

DETAILED DESCRIPTION

Figure 6:
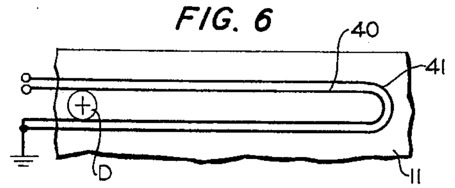
FIGS. 6 through 12 are schematic representations of a portion of an arrangement in accordance with this invention during operation.

The invention is directed at output implementations for domain propagation memories. Compatible memories are disclosed elsewhere. What is shown herein primarily is an output portion of such a memory in accordance with this invention.

FIG. 1 shows a sheet 11 of magnetic material characterized by a preferred direction of magnetization substantially normal to the plane of the sheet. The sheet is saturated initially in a first magnetization direction, assumed away from the reader and indicated by minus signs. A single wall domain is indicated by an encircled plus sign where the circle represents the single domain wall and the plus sign represents flux directed towards the reader. The area of a domain is a function of the material of sheet 11 and is determined by energy considerations involving the magnetostatic, exchange, and coercive forces characteristic of the material as is well known.

Broken line 12 indicates a propagation channel along which domains are propagated in response to pulses on conductors *d*1, *d*2, and *d*3 applied by three-phase propagation source PS. A single wall domain D is assumed to be propagating along channel 12 to an output position coupled by conductor 13.

Conductor 13 may be seen to couple an area of sheet 11 substantially larger than that occupied by domain D. Further, an interrogate conductor 14 also couples an even larger area of the output position of sheet 11. Conductors 13 and 14 are connected between a utilization circuit 16 and an interrogate pulse source PS1 respectively and ground. Circuit 16 and sources PS and PS1 are connected to a control circuit 17 by means of conductors 18, 19, and 20, respectively.

Single wall domains are provided in propagation channels, by means described in the aforementioned copending application, and propagated therealong by pulse source PS as is also described in that application. Source PS, briefly, pulses conductors *d*1, *d*2, and *d*3 consecutively. Conductors *d*1, *d*2, and *d*3, couple consecutively offset positions along channel 12 and, consequently, respond to the pulses by generating propagation fields in those next consecutive positions thus advancing the domain. When the domain reaches the output position, the propagation pulses are terminated under the control of control circuit 17. A pulse is applied, thereafter, to conductor 14 by pulse source PS1 also under the control of contol circuit 17.

FIGS. 2 and 3 show a cross section of sheet 11 at the output position. Domain D is represented by parallel imaginary lines 30 and 31 encompassing an arrow A representing flux directed upwards as viewed. The remainder of the sheet is in a magnetic condition represented by arrows A1 and A2 directed downward.

A positive pulse in conductor 14 of FIG. 2 generates a field in the upward direction within the output position, as represented by the arrows A3, thus expanding domain D. As domain D expands, the flux closing through air thereabout changes thus coupling conductor 13, as shown in FIG. 3, and generating an output pulse therein.

An example demonstrates the advantages of expanding a single wall domain during a readout operation. Consider a domain D one-half mil in diameter. A domain of that size, propagated past conductor 13 at a reference speed of 1,000 centimeters per second (cm./sec.) generates an output of 4 microvolts. In response to a 10 oersted (oe.) reference pulse on a conductor such as conductor 14 and of a polarity to collapse domain D, a pulse of 8 microvolts is generated in conductor 13. The like areas coupled by conductors 13 and 14 are relatively large. Assume, for example, that conductor 13 couples a oe-half inch diameter circular area of sheet 11. Domain D is moved into that coupled area and then expanded in response to a pulse on conductor 14. For an interrogate pulse of 10 oersteds, an output pulse of 4 millivolts is realized. The gain is proportional to square of the change in radius of the domain.

FIG. 1 illustrates access to the output position by only one propagation channel 12. It is to be appreciated that the relative size of the channel, fixed by the domain size and the propagation coupling geometry, with respect to the size of the output position, defined by the geometry (i.e., diameters) of the conductors 13 and 14, permits access to the output position via many channels. FIG. 4 illustrates the multiple access embodiment wherein channels $\mathbf{12}_1 \ldots \mathbf{12}_n$ are arranged to introduce domains into an output position defined by conductors 13 and 14. Conductors 13 and 14, in this instance, may couple an area of sheet 11 distorted from the circular form shown in FIG. 1 to accommodate the desired number of channels. Operation is as described above.

The general advantages of first expanding a domain rather than merely collapsing the domain initially or, alternatively, merely moving the domain past an output coupling is now clear.

In accordance with one aspect of this invention the shape of the output conductor 13 as well as conductor 14 follows a prescribed like repetitive geometry. FIG. 5 illustrates an arrangement wherein each of conductors 13 and 14 follows a multifinger geometry varying as, say, $a+b \sin \theta$ where $a$ is the displacement of the sine wave from the axis of symmetry as shown in FIG. 5. Only conductor 13 is shown.

Such a geometry may be used in two distinct modes of operation, in accordance with this invention. The first mode is a collapse mode. A domain is expanded to fill the area of magnetic material encompassed by conductor 13. The expansion is via domain wall motion and proceeds at a rate (mobility) characteristic of the magnetic material in response to an appropriate pulse on conductor 14. When the domain is fully expanded, the domain wall is very much enlarged extending for the full length of conductor 13. A field of polarity to collapse the domain generates in conductor 13 an output pulse of an amplitude related to the increased wall length.

Figure 7:
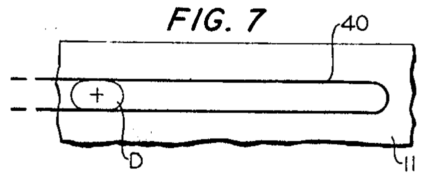
Figure 8:
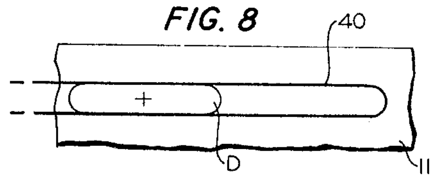
Figure 9:
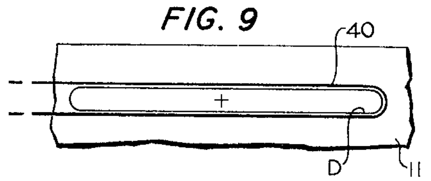
Figure 10:
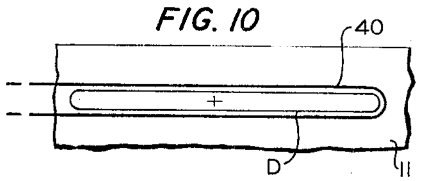
Figure 11:
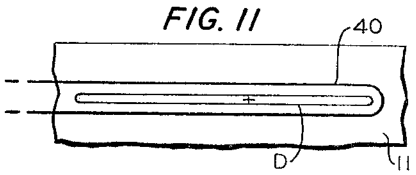
Figure 12:
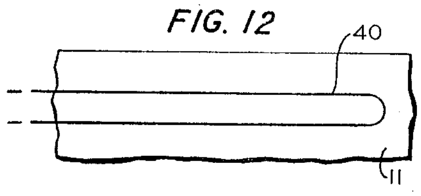

FIG. 6 illustrates a portion of one geometry which provides an increased output in accordance with this invention. The figure shows a finger-shaped output loop 40 to the open end of which a single wall domain D is moved during normal shift register operation. FIGS. 7, 8, and 9 illustrate the expansion of the domain into the "finger." FIG. 9 shows the domain fully expanded. A field of a polarity to (interrogate) collapse the domain is now generated by means of an appropriate pulse on a corresponding loop 41 of an interrogate conductor. The domain not only gets shorter but it also gets narrower as illustrated in FIGS. 10 and 11. It is clear that the rate of change in flux for an interrogate pulse of a given amplitude is larger if the domain wall is longer even though the wall velocity is unchanged. The operation is destructive as indicated by the absence of the domain in FIG. 12, or alternatively, nondestructive if complete collapse of the domain is avoided.

Figure 13:
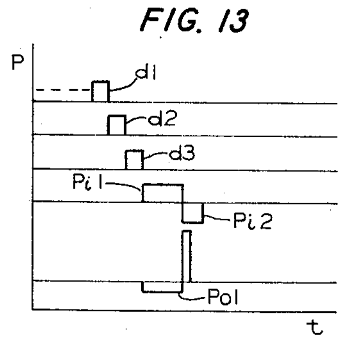
FIG. 13 is a pulse diagram of the operation of an output implementation in accordance with this invention.

The pulse program for operating in the collapse mode is shown in the pulse diagram of FIG. 13. Propagation pulses, designated *d*1, *d*2, and *d*3 in FIG. 13, to correspond with the propagation conductors shown in FIG. 1, advance a domain D into the position shown in FIG. 6. Next, a pulse P*i*1 of a polarity to expand the domain is applied to loop 41. Thereafter, a pulse of a polarity to collapse domain D is applied to loop 41. Pulse P*i*1 is accompanied by a low level output pulse P*o*1 in an associated output conductor corresponding to conductor 13 of FIG. 1. Pulse P*i*2, however, is accompanied by a relatively high level pulse P*o*2 having an amplitude and duration determined by the length of the domain wall in the fully expanded state and a duration determined by the time necessary to collapse the domain. Output pulse P*o*1, although low level, is of relatively long duration and is itself quite useful as described hereinafter.

Consider the example in which the finger-shaped conductor in FIG. 6 is 150 mils long and two mils wide. A half mil diameter domain D is expanded by a pulse of 100 oersteds to fill the finger-shaped area in 38 microseconds generating an output of 0.2 millivolt. The expanded domain is collaped by a pulse of 100 oersteds generating an output pulse of 30 millivolts. The saturation magnetization $B_s=100$ gauss and the $$\text{mobility}=100\frac{\text{cm.}}{\text{oe. sec.}}$$

for this example.

Figure 14:
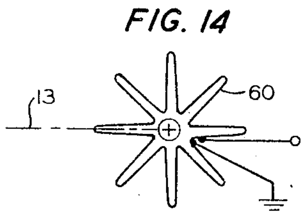

Of course, a multifingered output conductor permits a considerably increased output. Each "finger" permits the gain described above and a multifingered geometry requires only little, if any, additional time for a domain expansion to be carried out. FIG. 14 shows one multifingered structure 60 where the fingers are positioned as are spokes of a wheel. A domain D is moved by propagation pulses to the position of the hub of the wheel and then expanded. The domain expands into all fingers simultaneously.

The collapse mode has been described as utilizing interrogate and output conductors of like geometry in order to expand the domain to the shape of the output conductor. This like geometry for the interrogate conductor arrangement is not necessary. All that is required is an "interrogate" field to expand the domain. For example, a bias current on the output conductor present concurrently with an overall shapeless (uniform) field may be utilized to provide the desired shape. The collapse mode, then, requires only that the domain wall of a single wall domain be made long preferably with a minimum expansion in the area of the domain. That is to say, wall length is maximized with respect to the total enclosed flux. The longer the wall, the larger the output.

The second mode of operation is the expansion mode. Let us return for a moment to FIG. 5. The undulations of conductor 13 are described as generally following a (displaced) sine wave. The geometry of the conductor may be described by $a+b \sin \theta$ where $a$ is the displacement of the sine wave to either side of an axis of symmetry and $b$ is the amplitude of the sine wave. A domain moved into a protrusion formed by conductor 13 in the direction of the channel 12 and then expanded into the shape defined by conductor 13 generates therein a signal which approximates $a+b \sin \theta$.

The reason the expanding domain generates such a signal is that although the domain may be expanded by a uniform field, the rate of change of area of the expanding domain coupled to the output conductor is not uniform. Rather, the rate of change of area is defined by the geometry of conductor 13. Since the change in area is a measure of change in coupled flux, the change in flux is time varying and, consequently, so is the voltage induced thereby in conductor 13.

Figure 15:
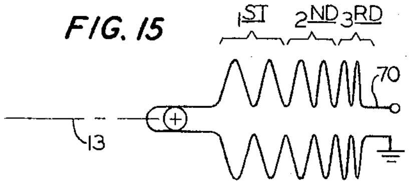

The expansion mode of operation has some very interesting ramifications. If the expansion of a domain may be made to generate a modulated signal as just described, why not a second signal and a third, et cetera. The domain need only be expanded past an output conductor having a geometry to correspond to first, second, third, et cetera signals. FIG. 15 shows a conductor 70 having a (finger) frequency-modulated shape to provide such signals. Operation is entirely analogous to that described above.

The multisignal arrangement of FIG. 15 permits simple code generation merely by arranging a plurality of output conductors on a magnetic sheet of the type described. If each conductor has a different multisignal geometry corresponding to different codes, a code is selected merely by expanding the corresponding domain. Output levels may be relatively low when compared to the collapse mode of operation but a more easily detected modulated signal is generated in the expansion mode.

Figure 16:
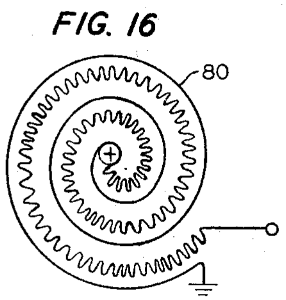

Additional signals may be provided at the expense of a longer output conductor. Since consecutive signals may be representative of voice signals, recordings may be made in this manner. A convenient geometry for such a recording is in a spiral shape as shown in FIG. 16. Domain D then is expanded along the channel formed by output conductor 80.

When the domain is fully expanded and all signals read out, it is convenient to collapse the domain again to its initial position. The domain may be collapsed in a manner consistent with that described hereinbefore. In order to keep the domain from being annihilated, however, a small magnet or additional circuit (not shown) may be positioned at the initial position to counter the "collapse" field there.

Single wall domains can be expanded controllably only within limits which are characteristic of each magnetic sheet useful in accordance with this invention. Also, each sheet is characterized by a limit below which domains cannot be collapsed controllably. Such limits may be calculated from well understood functions of the magnetization, wall energy, and sheet thickness, and also may be determined for any suitable material experimentally by one skilled in the art. Considerable device flexibility is permitted within those limits as the following example suggests: a reasonable mobility for suitable materials such as the rare earth orthoferrites would be about 100 cm./sec./oersted. Assume a 0.1 oersted expanding field is applied. The domain in response grows at the rate of 10 cm./sec. Assuming a one mil resolution (peak to peak) to the variations on the output conductor a very satisfactory 4 kilocycle response is achieved. A spiral of, for example, 500 turns on 5 mil centers and each having about a 10 centimeter circumference would play for over eight minutes. The signals appear as modulating voltages in the output conductor.

The conductor geometries may be formed by well known photoresist techniques, laser cutting techniques, or by other mass production techniques common in commercial recording manufacture.

It is also evident that similar results may be accomplished by changing not the shape of the output conductor but instead the shape of the magnetic material. For example, the surface may be corrugated so that variable rate of change of flux will occur for a constant domain wall velocity. Similar effects may be produced controlling the geometrical distribution of changing material properties by altering composition, temperature or mechanical stresses.

Still other means of producing controlled variations in output can be achieved by controlling the geometry of a layer of Permalloy lying in the magnetic circuit linking the output wire, for example as a thin layer on the material. Varying the thickness or edge by microcircuit techniques also will produce the variable control of the output signal.

What has been described is considered only illustrative of the principles of this invention. Accordingly, various modifications may be made therein by one skilled in the art without departing from the scope and spirit of the invention.

What is claimed is:

1. In combination, a sheet of magnetic material in which reverse magnetized domains are moved in response to propagation fields in excess of a characteristic propagation threshold, a conducting loop coupled to said sheet at said first position, said loop having a geometric pattern of variable magnetic coupling to said sheet along the direction of domain wall motion, and means moving a domain wall from said first position thereby altering magnetic flux through said loop in a manner to generate a signal corresponding to said geometrical pattern.

2. In combination, a sheet of magnetic material in which single wall domains are moved in response to propagation fields in excess of a characteristic propagation threshold, a first conducting loop coupled to said sheet at a first position, said loop having a repetitive first geometry, and means moving a domain at said first position thereby coupling the domain to said loop in a manner to generate a signal corresponding to said repetitive geometry.

3. A combination in accordance with claim 2 wherein said last-mentioned means comprises means expanding a domain.

4. A combination in accordance with claim 3 wherein said means expanding said domain includes a second conducting loop having a repetitive second geometry corresponding to said first.

5. A combination in accordance with claim 4 wherein said sheet is characterized by a preferred direction of magnetization out of the plane of the sheet.

6. A combination in accordance with claim 5 wherein each of said first and second geometries corresponds to a desired signal.

7. A combination in accordance with claim 5 wherein each of said first and second geometries corresponds to consecutive signals.

8. A combination in accordance with claim 5 wherein said second loop is of a geometry to lengthen disproportionately the domain wall about said domain as a domain in said first position expands.

9. A combination in accordance with claim 8 also including means collapsing single wall domains at said first positions.

No references cited.

JAMES W. MOFFITT, Primary Examiner